May 10, 1927.
C. H. PERRY
1,628,510
APPARATUS FOR FILTERING AND PURIFYING WATER
Filed Dec. 26, 1922
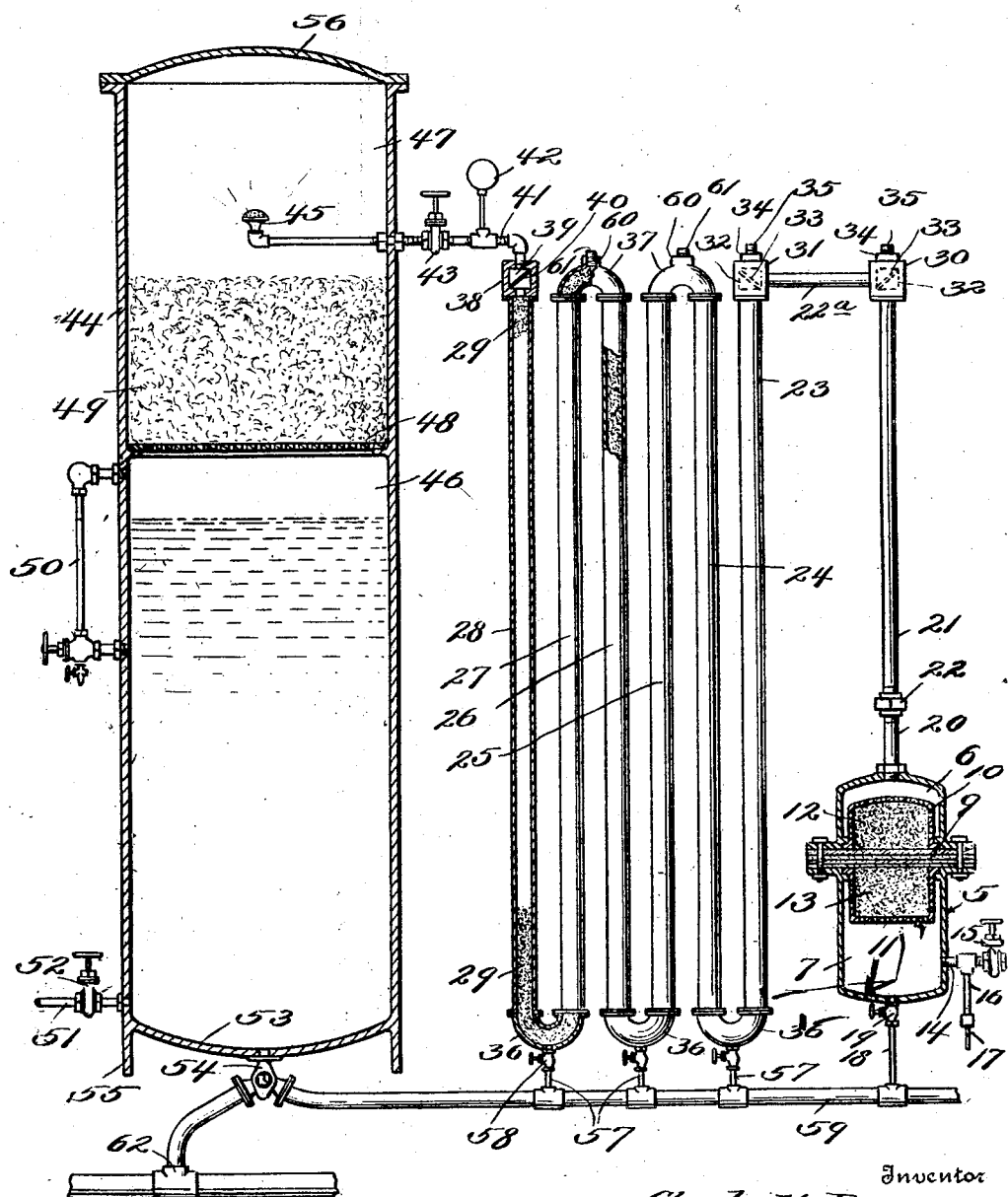
Inventor
Charles H. Perry
By James L. Norris
Attorney Patented May 10, 1927.

1,628,510

UNITED STATES PATENT OFFICE.

CHARLES H. PERRY, OF MIAMI, FLORIDA.

APPARATUS FOR FILTERING AND PURIFYING WATER.

Application filed December 26, 1922. Serial No. 609,003.

This invention relates to apparatus for filtering and purifying water. The essential principle involved in this invention is the compensation in an apparatus for the head pressure of water supplied thereto conjointly with the use of filtering media through which the water passes to effect a comparatively slow and thorough filtration and purification thereof, the compensating step being carried out by fully charging the apparatus with air under pressure equal to the pressure of the water supplied to the apparatus from any suitable source, and whereby the head force or pressure of the water is neutralized and the water permitted to slowly pass through an elongated filtering and aerating course and by this means be more effectively purified; the apparatus being at all times under the control of an operator but only requiring maintenance of the predetermined air pressure at intervals after the water to be purified has been admitted to and continues to flow into the apparatus.

From the principle of operation specified it will be obvious that the primary object of the invention is to insure a complete elimination from contaminated water of all impurities, disease-carrying germs and odors, and to effectively treat chemically impregnated water to materially reduce the primarily strong character of the several chemicals carried by different waters and which may be unpalatable to some persons, and particularly in treating water carrying lime in solution therewith to render the latter soft and more pleasing to the taste.

A further object of the invention is to provide a water-treating apparatus of a comparatively simple character which may be easily charged both with air and water and which will continue to filter water as long as the water is supplied thereto, and also to associate with said apparatus means whereby the apparatus may be thoroughly sterilized by introducing and filling all of the parts thereof with steam, to cleanse the filtering material and also the walls and joints of the several receiving, conveying and water-holding mediums.

With these and other objects and advantages in view, the invention consists in the construction and arrangement of parts which will be more fully hereinafter described and claimed.

The numeral 5 designates a receiving receptacle or tank comprising upper and lower sections providing chambers 6 and 7 separated by layers 9 of asbestos, which are securely held in horizontal position to the flanges of the sections of the said receiving tank or chamber by fastening means that may be detached for separating the parts of the tank or receiver. On opposite sides of the layers 9 of asbestos are reversely arranged foraminous enclosures 10 and 11, which may be formed of wire gauze and are held securely in place and open to the layers 9 of asbestos, the said foraminous enclosures or receptacles 10 and 11 being respectively supplied with a filling of filtering material such as gravel, charcoal or other well known or preferred filtering substance. Connected to the tank or receiver 5 and communicating with the lower chamber 7 is a water inlet pipe 14 that is adapted to be connected to any suitable water supply source and which has a valve 15 for regulating the flow of water therethrough. Between the valve 15 and the tank or receptacle 5 an air pipe 16 is attached and communicates with the pipe 14 and has a suitable air valve 17 of the type usually employed in connection with vehicle tires. To the top of the tank or receptacle 5 an outlet pipe 20 is secured and has an upright conveying pipe 21 coupled thereto, as at 22. The upper end of the pipe 21 is secured to a horizontal connection 22ª and the latter in turn is connected to the upper end of the vertical pipe 23, which forms the first of a series of pipe sections or filtering elements comprising in sequence vertical pipes 24, 25, 26, 27 and 28, each of which is filled with filtering material 29 consisting of gravel or comminuted charcoal. Between the upper end of the pipe 21, the pipe 22ª and the upper end of the pipe 23 are coupling heads 30 and 31 which are chambered, as at 32, and have screens 33 therein, to prevent shifting or displacement of the filtering material. The tops of the coupling heads 30 and 31 are each formed or provided with an inlet 34 in the form of an interiorly screw-threaded nipple to removably receive a plug 35 for permitting access to the pipes for the introduction of filtering material when found necessary. The pipes 23 to 28, inclusive, have lower U-shaped or curved coupling unions 36 and the upper ends of the pipes 24 to 27, inclusive, are connected by similar coupling unions 37, these unions 36 and 37 being completely filled with the filtering material 29. On the upper end of the last pipe 28 of the series of filtering pipes is a coupling head 38 similar to the heads 30 and 31 heretofore described, the head 38 having a chamber 39 therein with a screen 40, to prevent the filtering material from passing upwardly from the pipe 28 beyond the coupling head thereon. Attached to the top of the coupling head 38 is a delivery pipe 41, which is of less diameter than the series of filtering pipes 23 to 28, inclusive, and is provided with a pressure gage 42 and a controlling valve 43. The pipe 41 is horizontally disposed and projects into a final filtering and storage receptacle 44 and has on the inner end thereof a spray nozzle 45. The receptacle or tank 44 has considerable capacity and is divided into a lower filtered water receiving chamber 46 and an upper final filtering chamber 47 by a foraminous or reticulated horizontally disposed partition 48 on which is disposed a mass of filtering material 49 composed of gravel or charcoal or both and which is below the pipe 41 and nozzle 45 of the latter. The chamber 46 for the filtered water has a level gage 50 of any preferred type communicating therewith and at the bottom of this chamber is an outlet or discharge pipe 51 having a valve 52. The bottom 53 of the receptacle or tank 44 is preferably dished and has any preferred form of two-way valve 54 connected to the center thereof and depending below the same, the body of the receptacle or tank 44 being continued below the bottom 53, as at 55, to serve as supporting means for the said receptacle. The chamber 47 is closed by a top 56, and between the top level of the filtering material 49 and the top 56 considerable space is provided for receiving the water from the supply nozzle 45.

Drain connections 57 are attached to the lowermost portions of the coupling unions 36 and are each provided with a valve 58, and also connected to the bottom of the receiver 5 and communicating with the lower chamber 7 of the latter is a drain connection 18 having a valve 19. The drain connections 18 and 57 are all attached to a common drain pipe 59, the latter also being connected at one end to the two-way valve 54 depending below the bottom 53 of the receptacle or tank 44. By means of these drain connections 18 and 57 and drain pipe 59 all of the parts of the apparatus may be drained by opening the valves 19, 58 and 54, so as to set up communication between the lower portions or extremities of the several parts with which the drain connections and drain pipe are associated, and by this means the apparatus may be readily relieved of any water and sediment therein when it is desired to clean the several components of the apparatus. The upper unions 37 of the pipes 24 to 27, inclusive, have inlets 60 in the form of interiorly screw-threaded nipples for the reception of removable screw-threaded plugs 61, to permit the pipes below to be filled or replenished with the filtering material 29 when found necessary. The valve 54 also has a steam pipe connection 62 attached thereto, and after the several filtering parts or components have been relieved of water through the drain connections hereinbefore explained, the valve 54 is adjusted so as to cut off the drain pipe 59 from communication therewith and with the bottom of the receptacle or tank 44 and open up the steam connection 62, to permit all of the parts or components to have steam blown therethrough under pressure and liberated into the drain pipe 59 through the connections 18 and 57 for thoroughly cleaning out all of the parts of the apparatus and also to thoroughly sterilize the same.

The method of filtering water with the aid of the preferred apparatus hereinbefore disclosed is as follows:

Before admitting water through the pipe 14 into the lower chamber 7 of the receiver 5 the valve 15 is closed and an air pump or pipe for conveying air under pressure is attached to the pipe 16, care also being taken to close the valves 19, 58, 54 and 52 and open the valve 43. Air under pressure is then introduced into all of the parts, the pressure being determined through the medium of the gage 42 and which will be similar to the pressure of the water to be admitted for the purpose of filtration and purification. After the several parts and components of the apparatus have been fully charged with air at the predetermined pressure, the air pump or compressed air connection is detached from the pipe 16 and the valve 17 automatically closes and the valve 15 is then opened to permit the water to enter the receiver 5. The water entering the receiver 5 is first treated by the filtering material 13 and 12 and is forced to pass through the asbestos fillers 9 and is relieved of the coarser or heavier impurities which settle on the bottom of the chamber 7 of the receiver. The water then gradually rises through the outlet connection 20 and pipe 21 and passes through the pipe 22ª and trickles or more expeditiously falls through the pipe 23 and slowly ascends through the pipe 24, and so on through the whole series of pipes until the water treated finally slowly elevates through the pipe 28 and passes from the head 38 by means of the pipe 41 to the head 45, which delivers the water in the chamber 47 above the filtering material 49 in a fine spray and immediately passes through the said filtering material 49 and the foraminous or reticulated partition or screen 48 into the storage chamber 46 in a fully filtered and purified condition and ready for use, the filtered water being drawn off through the pipe 51 by opening the valve 52. During its course through the several filtering pipe sections and before reaching the chamber 47, the water is subjected to a thorough filtering action of a slow character, or the water progresses slowly through a long line of conveying means containing filtering material which will operate to thoroughly relieve the water of all impurities and chemical or other impregnations. It will be understood that as the water progresses through the filtering conveying means and when it enters the receptacle or tank 44 and is subjected to final filtering treatment, it will also be thoroughly aerated, with material advantages in relieving the water of all odors and also in giving life to the water. It will also be understood that in draining the filtered water off from the storage chamber 46, more or less air will pass out therewith and it will be necessary therefore at intervals, in order to maintain the necessary volume of air under pressure in the several components of the apparatus, to re-supply or recharge the same through the pipe connection 16 by first shutting off the valve 15, the deficiency in requisite volume and pressure of air and the sufficiency thereof after replenishment being readily discernible from the gage 42.

The filtering apparatus embodying structural features of the invention as hereinbefore disclosed is entirely automatic in its operation after the several components have been charged with air under pressure corresponding to the pressure of the water to be filtered and after the water has been admitted to the receiver 5 and continues to flow from the supply connection into said receiver and then through the remaining components of the apparatus. As hereinbefore specified the several components of the apparatus may be readily cleaned and sterilized and preserved in a desirable hygienic condition. The apparatus is also comparatively simple in the construction and arrangement of the several parts, and it is obvious that to accommodate various installations thereof, changes in the proportions and general dimensions may be adopted at will, and moreover, the pipe sections 23 to 28, inclusive, may be increased or decreased without departing from the scope of the invention.

What is claimed as new is:

1. An apparatus for filtering and purifying water, comprising a centrally located series of upright filtering pipe conduits connected at their upper and lower extremities by connecting bends, the said pipe conduits and bends being all filled with filtering material and the pipe conduits being in parallel relation, inlet and outlet filtering mediums connected to the first and last pipe conduits of the series, the inlet medium being provided with means for admitting air under pressure and creating a uniformity of pressure within all the conduits approximating that of the water to be filtered, and the outlet medium having storage means for the filtered water.

2. An apparatus for filtering and purifying water, comprising an intermediate group of vertically disposed alined pipe conduits all terminally connected for continuation of the rise and fall of the liquid passing therethrough and all of the conduits and their terminal connections being supplied with a filling of filtering material, the series of vertical conduits at one end being connected to a receiver for the purified water and at the other end to means for supplying unfiltered water thereto, the said pipe conduits being also provided with a series of cut-off and regulating valve and drain means and the means for supplying unfiltered water thereto having a connection therewith for applying air under pressure sufficient to cause the water being filtered to pass slowly through the pipe conduits.

3. An apparatus for filtering and purifying water, comprising an intermediate series of vertically disposed parallel pipe conduits connected by upper and lower bends, the conduits and bends having filtering material therein, water supply and receiving means being attached to opposite terminals of the series of pipe conduits, the pipe conduits and their bends having filtering material disposed therein fully throughout the extent thereof and the supply means having an air-under-pressure connection for filling the pipe conduits with air under pressure to a proper degree relatively to the water passing therethrough to insure a slow filtering operation, the conduits also being provided with means for supplying the same with filtering material and with valve connections and a drain for controlling the operation of said conduits, the conduits having chambered heads with screens disposed therein to retain the filtering material in place in the several pipe conduit units and to prevent the material from passing out from the series of pipe conduits into the receiver for the filtered water.

4. An apparatus for filtering and purifying water, comprising a series of vertically disposed parallel pipe conduits terminally attached at one end to the upper part of a receiver and at the opposite end to means for supplying unfiltered water and connected by terminal bends, the pipe conduits and their bends being filled with filtering material and also having reticulated means at their upper portions which prevents the filtering material from becoming separated from the pipe conduits, the supply means for the series of pipe conduits having an air pressure connection for filling the conduits with air under pressure to effect a slowness of movement of the liquid filtering through the said conduits, the receiver and supply means and the conduits all having valved inlets and outlets and a common drain pipe together with a steam pipe connection for cleaning purposes.

In testimony whereof I have hereunto set my hand.

CHARLES H. PERRY.